No. 650,336. Patented May 22, 1900.
R. E. McKINLEY.
COMBINED SAW SET AND JOINTER.
(Application filed May 29, 1899.)
(No Model.)

Witnesses:
M. Hunter
H. Levis

Inventor
R E McKinley
per
C D Levis
Att'y

UNITED STATES PATENT OFFICE.

ROBERT E. McKINLEY, OF CARNEGIE, PENNSYLVANIA, ASSIGNOR OF ONE-HALF TO H. L. CRUM, OF BRIDGEVILLE, PENNSYLVANIA.

COMBINED SAW SET AND JOINTER.

SPECIFICATION forming part of Letters Patent No. 650,336, dated May 22, 1900.

Application filed May 29, 1899. Serial No. 718,686. (No model.)

*To all whom it may concern:*

Be it known that I, ROBERT E. MCKINLEY, a citizen of the United States of America, residing at Carnegie, in the county of Allegheny and State of Pennsylvania, have invented certain new and useful Improvements in a Combined Saw Set and Jointer; and I do hereby declare the following to be a full, clear, and exact description thereof, reference being had to the accompanying drawings, which form a part of this specification.

This invention relates to certain new and useful improvements in a combined saw set and jointer.

The invention has for its object the provision of a simple, practical, and inexpensive tool for the above purpose and by which a saw may be quickly and accurately set and jointed, thus saving both time and labor.

With the above object in view the invention finally consists in the novel construction, combination, and arrangements of parts, as will be hereinafter more specifically described in detail.

In describing the invention in detail reference is had to the accompanying drawings, forming a part of this specification, and wherein like numerals of reference designate like parts throughout both views, in which—

Figure 1:
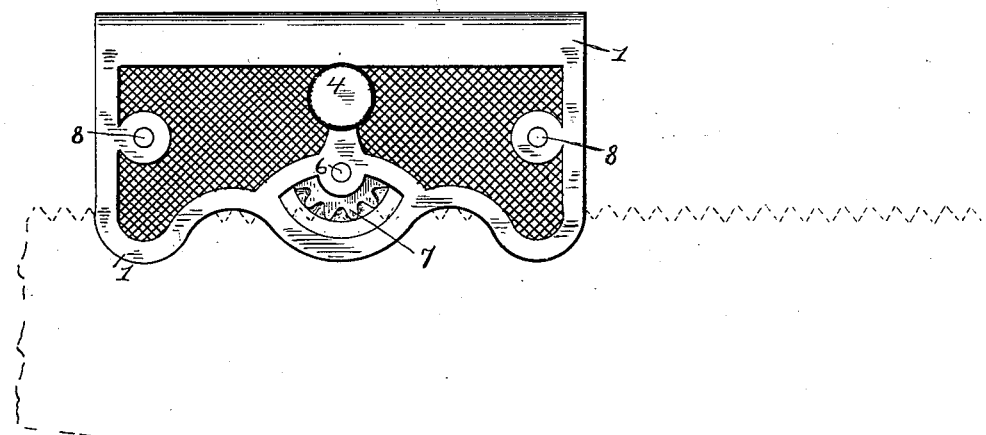
Figure 2:
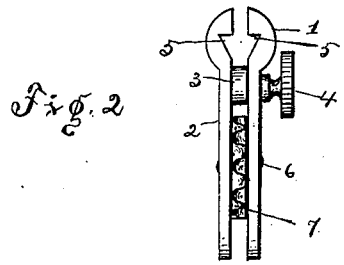

Figure 1 is a side view of my improved device. Fig. 2 is an end view of the same.

In the drawings the numerals 1 and 2 designate a pair of guide-plates of any suitable design, and upon the inner side of one of the plates is formed a boss or shoulder 3, and through the other plate is formed a hole through which the threaded shank of the thumb-screw 4 extends and engages with a threaded opening in the said boss for the purpose of securing the plates together. Near the upper edges of the plates and at the inner sides are formed the angular grooves 5 for the reception of a saw-file when used as a jointer.

Pivoted upon a pin 6, which is arranged between the plates, is the setting-wheel 7. This wheel has a corrugated face around its periphery, so that when it is rolled over the saw-teeth each tooth will enter one of the dents and turn the tooth in that direction, the action of the setting-wheel rolling upon the saw-teeth being somewhat similar to the rolling of a gear-wheel upon a gear-rack.

It is understood that some pressure will be required in using the device, and by a few movements over the length of the saw will set each tooth accurately and with no danger of breaking any teeth. A pair of holes 8 is provided in the plates, so that two wheels may be pivoted therein and used instead of one, or other wheels for finer or coarser teeth may be employed.

Slight modification may be made in the construction and design without departing from the general principle employed.

Having thus fully shown and described my invention, what I claim as new, and desire to secure by Letters Patent, is—

The combination of a pair of guide or clamp plates provided on their inner faces near their upper edge with an angular groove and each provided below the grooves with openings 8, one of said plates having a boss on its inner face and the other having an opening registering with the threaded opening in the boss, a thumb-screw having its threaded shank engaging in said opening and boss for securing the plates together, and a setting-wheel rotatably mounted between said guide or clamp plates, substantially as described.

In testimony whereof I have hereunto affixed my signature in the presence of two subscribing witnesses.

ROBT. E. McKINLEY.

Witnesses:
JOHN DOWNEY,
M. HUNTER.